United States Patent
Choi

(10) Patent No.: US 8,392,154 B2
(45) Date of Patent: Mar. 5, 2013

(54) SYSTEM AND METHOD FOR REAL-TIME CLOTH SIMULATION

(75) Inventor: Kwang-Jin Choi, Seoul (KR)

(73) Assignee: FXGear Inc., Seoul (KR)

( * ) Notice: Subject to any disclaimer, the term of this patent is extended or adjusted under 35 U.S.C. 154(b) by 479 days.

(21) Appl. No.: 12/517,734

(22) PCT Filed: Jun. 28, 2007

(86) PCT No.: PCT/KR2007/003132
§ 371 (c)(1),
(2), (4) Date: Jun. 4, 2009

(87) PCT Pub. No.: WO2008/146972
PCT Pub. Date: Dec. 4, 2008

(65) Prior Publication Data
US 2010/0070246 A1   Mar. 18, 2010

(30) Foreign Application Priority Data
May 29, 2007   (KR) ................. 10-2007-0052115

(51) Int. Cl.
*G06F 7/60* (2006.01)
*G06F 17/10* (2006.01)
(52) U.S. Cl. ............................................. 703/2
(58) Field of Classification Search .................. 703/2, 6
See application file for complete search history.

(56) References Cited

U.S. PATENT DOCUMENTS

| | | | |
|---|---|---|---|
| 6,462,740 B1* | 10/2002 | Immel | 345/473 |
| 6,509,899 B1* | 1/2003 | Anderson | 345/473 |
| 6,909,431 B1* | 6/2005 | Anderson et al. | 345/473 |
| 7,385,603 B2* | 6/2008 | Piponi | 345/423 |
| 7,512,528 B2* | 3/2009 | Ko et al. | 703/6 |
| 7,616,204 B2* | 11/2009 | Müller et al. | 345/474 |
| 8,000,947 B1* | 8/2011 | Qureshi et al. | 703/6 |
| 2007/0129916 A1* | 6/2007 | Muller et al. | 703/2 |
| 2009/0018803 A1* | 1/2009 | Ko et al. | 703/2 |

OTHER PUBLICATIONS

Barbi et al., 2005, Real-Time subspace integration for St. Venant-Kirchhoff deformable models. In ACM SIGGRAPH 2005 Papers (SIGGRAPH '05), Markus Gross (Ed.). ACM, New York, NY, USA, pp. 982-990.*
Choi et al., 2005, Stable but responsive cloth. In ACM SIGGRAPH 2005 Courses (SIGGRAPH '05), John Fujii (Ed.). ACM, New York, NY, USA, pp. 604-611.*
S. Romero, L.F. Romero, E.L. Zapata, Approaching real-time cloth simulation using paralelism. 16th IMACS World Congress 2000 on Scientific Computation, Applied Mathematics and Simulation, 2000.*

* cited by examiner

*Primary Examiner* — Mary C Jacob
*Assistant Examiner* — Aniss Chad
(74) *Attorney, Agent, or Firm* — NSIP Law

(57) ABSTRACT

A cloth simulation system is provided which comprises a position calculation module calculating relative positions of adjacent vertices among a plurality of vertices on the cloth in the next time step, using the positions of the vertices in the previous time steps; an analysis module establishing an equation of motion of the respective vertices using the relative positions; and an updating module updating the positions of the respective vertices using the equation of motion, whereby the texture and reality of cloth is increased furthermore, a motion of the cloth is calculated in real-time, so that there is no inconvenience to fabricate clothes animation in advance depending upon the number of the motions of to-be-expressed object, thereby con¬ siderably reducing the fabricating costs and period.

14 Claims, 2 Drawing Sheets

SYSTEM AND METHOD FOR REAL-TIME CLOTH SIMULATION

CROSS-REFERENCE TO RELATED APPLICATION(S)

This application claims the benefit under 35 U.S.C. §119 of a Korean Patent Application No. 10-2007-0052115, filed on May 29, 2007, and of a PCT international application no. PCT/KR2007/003132, filed on Jun. 28, 2007, the entire disclosures of which are hereby incorporated by reference for all purposes.

TECHNICAL FIELD

The present invention relates to a system and method for simulating the motion of cloth in real-time. More particularly, the present invention relates to a system and method for rapidly and realistically simulating cloth in real-time by estimating variation over time in positions of a plurality of vertices set on the cloth to be expressed, and calculating the motion of the respective vertices through an energy defined using the estimated position, in order to express the texture and motion of the cloth simulated using a computer.

BACKGROUND ART

With the development of computer hardware, hardware capable of carrying out a parallel operation using one or more cores has appeared on the stage. Unlike the existing method contriving to increase an operation speed with the increase in clock of a CPU, the parallel operation environment makes operations parallel using a plurality of processors or vector operation to increase the operation speed, which is suitable for high speed operation of multiple physical objects.

As hardware providing the parallel operation environment has been developed, physical engines of computer programs operating using the hardware have been developed accordingly. The physical engines such as Havok or Physx currently used in the parallel operation environment are generally used for accelerating a simulation or collision process of rigid bodies or particles. However, these engines have excellent performance to trace the motion of the rigid bodies, but have common performance to simulate the motion and texture of cloth so as to express clothes.

The cloth simulation method according to the prior art expresses the motion and texture of the whole cloth by setting multiple vertices on the cloth to be traced and calculating the variation over time in position of the respective vertices. In order to calculate the variation in position of the respective vertices, the prior art technology implements Verlet integration to the positions of the respective vertices over time and converges the integrated value so as to satisfy the limitation that a length of cloth is maintained constant, thereby calculating the position of the vertices.

However, the prior art technology using Verlet integration has problems in that it can be optimally implemented only under the environment that there are a number of processors, that a converging speed of the integrated value for the positions of the respective vertices is slow, and that converging of the integrated value is not guaranteed, degrading the stability. In addition, as the number of the vertices increases, operation load increases excessively, and limitation condition that a length of cloth is essentially maintained constant is used so that physical properties of cloth is not expressed freely.

In a real-time 3D application including all games such as a sports game, a war game, a multi-media online role-playing game (MMORPG), etc., in which characters similar to humans enter the stage, clothes are an important factor. However, as set forth above, the prior technology is not suitable to express the motion and texture of cloth. Thus, it is true at present that in order for expressing the cloth in the costumes, previously operated and stored data is read out and implemented with an animation process, or otherwise, clothes animation is not used at all.

Further, recently in Europe (E-tailor project, Fraun Hopper, Miralab), Japan (Digital Fashion Ltd.), and Republic of Korea (I-fashion), a 3D virtual system has been developed with which a user can virtually wear clothes. While a real-time cloth simulation technology for expressing clothes chosen by a user in real time is the core point in such a system, there is no system adopting such a real time cloth simulation technology at present. Therefore, there is a need to develop a real time cloth simulation technology capable of not only carrying out a real time process, but also having high quality.

DISCLOSURE OF INVENTION

Technical Problem

The present invention has been made to solve the problems of the above-mentioned prior technology, and an object of the present invention is to provide a real-time cloth simulation system and method with which optimization can be implemented under diverse environments, a convergence speed is fast, and physical properties of cloth are freely expressed, through using not Verlet integration, but semi-implicit integration.

Technical Solution

In order to accomplish above and other objects, according to an aspect of the present invention, there is provided a cloth simulation system comprising: a position calculation module calculating relative positions of adjacent vertices among a plurality of vertices on the cloth in the next time step, using the positions of the vertices in the previous time steps; an analysis module establishing an equation of motion of the respective vertices using the relative positions; and an updating module updating the positions of the respective vertices using the equation of motion.

According to another aspect of the present invention, there is provided a cloth simulation method comprising the steps of: calculating relative positions of adjacent vertices among a plurality of vertices on the cloth in the next time step, using the positions of the vertices in the previous time steps; establishing an equation of motion of the respective vertices using the relative positions; and updating the positions of the respective vertices using the equation of motion.

Advantageous Effects

The cloth simulation system and method of the present invention provides advantages in that in a real-time 3D application including games, the texture and reality of cloth expressed in computer graphic is increased furthermore, a motion of the cloth can be calculated in real-time, so that there is no inconvenience to fabricate clothes animation in advance depending upon the number of the motions of the object, thereby considerably reducing the fabricating costs and period.

MODE FOR THE INVENTION

Description will now be made of preferred embodiments of the present invention with reference to accompanying drawings.

Figure 1:
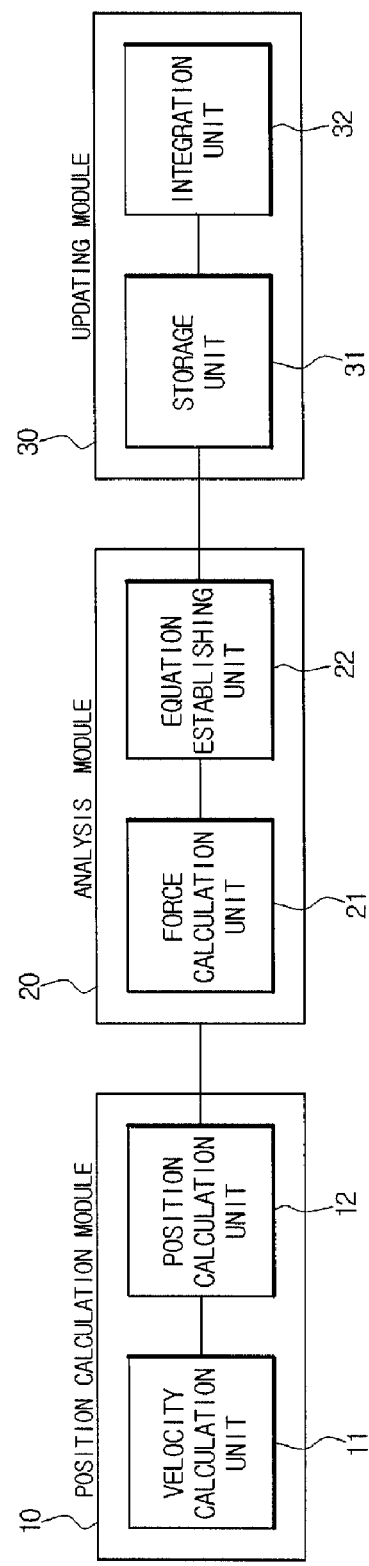
FIG. 1 is a block diagram illustrating the construction of a real-time cloth simulation system according to an embodiment of the present invention.

FIG. 1 is a block diagram illustrating the construction of a cloth simulation system according to an embodiment of the present invention. The cloth simulation system illustrated includes a position calculation module 10 estimating and calculating positions of a plurality of vertices set on cloth in the next time step, an analysis module 20 establishing an equation of motion of the respective vertices from an energy defined using the estimated results, and an updating module updating the positions of the respective vertices by solving the equation of motion.

Figure 2:
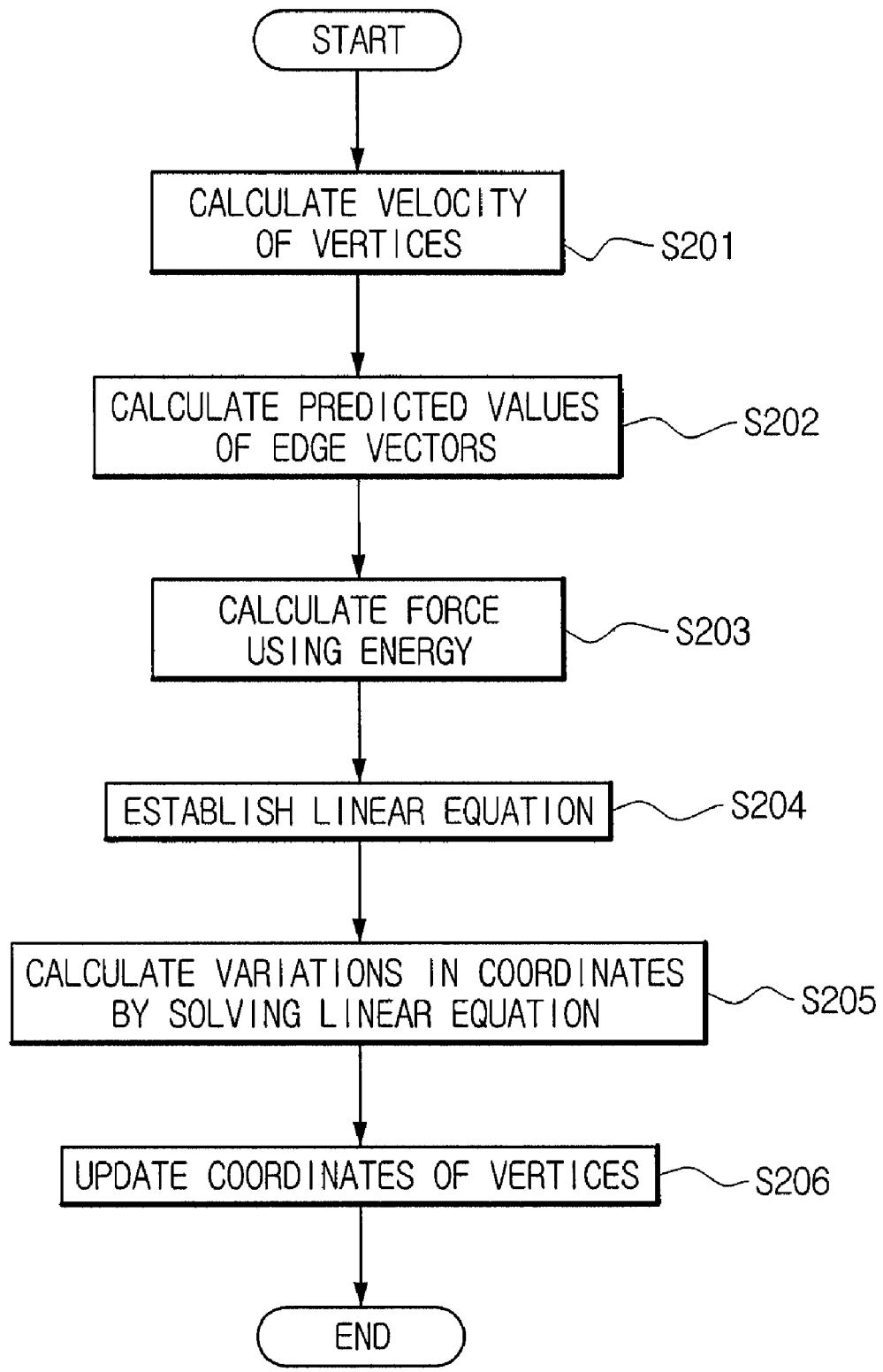
FIG. 2 is a flow chart illustrating a procedure of a real-time cloth simulation method according to an embodiment of the present invention.

FIG. 2 is a flow chart illustrating a procedure of a cloth simulation method according to an embodiment of the present invention. The cloth simulation method according an embodiment of the present invention is carried out using the plurality of vertices set on the cloth to be expressed using a computer in order to express the texture of the cloth and calculate a motion of the cloth. In the description, the plurality of vertices set on a sheet of cloth is expressed as a subscript, i, and a vector $x_i$ indicative of the 3D positions of the respective vertices is expressed as following Math Figure 1. $u_i$, $v_i$ and $w_i$ are respectively indicative of x, y, and z coordinates. $\Delta x_i$ indicates variation of $x_i$ between the respective time steps.

MathFigure 1

$$x_i = \begin{bmatrix} u_i \\ v_i \\ w_i \end{bmatrix}, \Delta x_i = \begin{bmatrix} \Delta u_i \\ \Delta v_i \\ \Delta w_i \end{bmatrix} \quad [\text{Math. 1}]$$

Position Calculation Module

The position calculation module 10 estimates and calculates relative positions of adjacent vertices in the next time step using the positions of the respective vertices in the previous time step. To this end, a velocity calculation unit 11 included in the position calculation module 10 calculates a velocity vector v indicative of velocities of the respective vertices at each time step is calculated by Math Figure 2 (S201). The respective time steps are expressed as an index of 0, 1, 2, . . . , n−1, n, and $\Delta t$ indicates a time interval between the time steps.

MathFigure 2

$$v^n = \frac{x^n - x^{n-1}}{\Delta t} \quad [\text{Math. 2}]$$

A position calculation unit 12 calculates the relative positions of the respective vertices at the next time step (n+1) using velocities at the previous time step (n) and the time step (n−1) (S202). The relative positions of the respective vertices are obtained as a difference between predicted position vectors of the respective vertices, and are expressed as an edge vector. First, predicted position vectors $$\overline{x}_i$$

and $$\overline{x}_j$$

of ith vertex and jth vertex are calculated by Math Figure 3.

MathFigure 3

$$\overline{x}_i = x_i^n + \frac{1}{2}\alpha\Delta t(v_i^n + v_i^{n-1}), \quad [\text{Math. 3}]$$

$$\overline{x}_j = x_j^n + \frac{1}{2}\alpha\Delta t(v_j^n + v_j^{n-1}),$$

$$0 \le \alpha \le 1$$

When the predicted position vectors are calculated, the edge vector $e_{i,j}$ indicative of a difference between the position vector of jth vertex and the position vector of ith vertex is defined by Math Figure 4.

MathFigure 4

$$e_{i,j} = x_j - x_i \quad [\text{Math. 4}]$$

A predicted value $$\overline{e}_{i,j}$$

of the edge vector $e_{i,j}$ at the next time step (n+1) is calculated by Math Figure 5. In Math Figure 5, L is a scalar quantity indicative of an initial length between jth vertex and ith vertex.

MathFigure 5

$$\overline{e}_{i,j} = L\frac{\overline{x}_j - \overline{x}_i}{\|\overline{x}_j - \overline{x}_i\|} \quad [\text{Math. 5}]$$

The position calculation unit 12 predicts and calculates a value of the edge vector indicating a relative position between adjacent vertices using above Math Figures 3 to 5. The calculated value of $$\overline{e}_{i,j}$$

is transferred to the analysis module 20.

Analysis Module

A force calculation unit 21 included in the analysis module 20 calculates forces applied to the respective vertices using the calculated $$\overline{e}_{i,j}$$

from the position calculation module 10 (S203). For example, the energy due to an internal force between ith vertex and jth vertex is defined by Math Figure 6.

MathFigure 6

$$E_{i,j} = \frac{1}{2}k\|e_{i,j} - \overline{e}_{i,j}\|^2 \quad [\text{Math. 6}]$$

In Math Figure 6, k is modulus of elasticity indicative of elasticity between jth vertex and ith vertex, and a dimension of which differs depending upon the stiffness of to-be-expressed cloth. For example, in case of hardly expandable or shrinkable cloth, a value of k becomes very large, and in case of easily expandable cloth, k becomes small.

A vector e extending $e_{i,j}$ included in Math Figure 6 to the whole vertices included in cloth is defined by Math Figure 7. Herein, since $e_{i,j}$ is defined like Math Figure 4, when each $e_{i,j}$ is rewritten with the position vector x of the respective vertices, it is expressed as the right side of Math Figure 7.

MathFigure 7

$$e = \begin{bmatrix} e_{1,2} \\ \vdots \\ e_{i,j} \\ \vdots \\ e_{n-1,n} \end{bmatrix}_{i \neq j}$$

$$= \begin{bmatrix} x_2 - x_1 \\ x_j - x_i \\ x_n - x_{n-1} \end{bmatrix}$$

$$= \begin{bmatrix} -1 & 1 & \cdots & \cdots & \cdots \\ -1 & 0 & 1 & \cdots & \cdots \\ -1 & 0 & 0 & -1 & \cdots \\ \vdots & \vdots & \vdots & \vdots & \vdots \\ 0 & 0 & \cdots & -1 & 1 \end{bmatrix} \begin{bmatrix} x_1 \\ \vdots \\ x_i \\ \vdots \\ x_n \end{bmatrix}$$

$$= Tx$$

[Math. 7]

When e defined by Math Figure 7 is substituted for Math Figure 6, and energy $E_{i,j}$ between ith vertex and jth vertex is summed through the whole vertices included in the cloth, an energy E of the whole cloth is calculated by Math Figure 8.

MathFigure 8

$$E = \sum_{i,j} E_{i,j} = \frac{1}{2} k \| Tx - \bar{e} \|^2 \quad \text{[Math. 8]}$$

When the energy calculated by Math Figure 8 is integrated over position, a force vector F applied to the respective vertices can be calculated by Math Figure 9.

MathFigure 9

$$F = -\frac{\partial E}{\partial x} = -kT^T(Tx - \bar{e}) \quad \text{[Math. 9]}$$

If there is an external force, such as gravity force, applied to the respective vertices in addition to the force calculated by Math Figure 9, a vector by the external force should be added to the force vector F.

When the force vector applied to the whole cloth is calculated by the force calculation unit 21, an equation establishing unit 22 establishes a linear equation of motion for the whole cloth using the calculated force vector (S204). First, when the calculated force vector is integrated again by the position vector, Jacobian J of the whole vertices can be obtained.

MathFigure 10

$$J = -\frac{\partial F}{\partial x} = -kT^T T \quad \text{[Math. 10]}$$

In Math Figure 10, k is constant as modulus of elasticity, a vector T is a constant matrix as defined by Math Figure 7, so that the whole Jacobian also becomes a constant matrix.

The equation establishing unit 22 establishes an equation of motion for semi-implicit integration through substituting the calculated Jacobian. The established equation of motion is expressed as Math Figure 11.

MathFigure 11

$$(mI - h^2 kJ)(x(n+1) - x(n)) = mhv(n) + h^2 f(n) \quad \text{[Math.11]}$$

In Math Figure 11, (n) and (n+1) are indices indicative of the time steps. Accordingly, x(n), F(n), and v(n) each are vectors respectively indicative of positions of the whole vertices, forces applied to the vertices, and velocities. In addition, m is indicative of mass of the respective vertices, I is an identity matrix, and h is a time interval Δt between the respective time steps. Math Figure 12 can be obtained by dividing Math Figure 11 by m.

MathFigure 12

$$\left(I - \frac{h^2 k}{m} J\right)(x(n+1) - x(n)) = hv(n) + \frac{h^2 F(n)}{m} \quad \text{[Math. 12]}$$

In the equation of motion expressed by Math Figure 12, the expression in the right side and the expressions in parentheses in the left side can be respectively expressed with a single letter by Math Figures 13 to 15.

MathFigure 13

$$A = I - \frac{h^2 k}{m} J = I + \frac{h^2 k}{m} kT^T T \quad \text{[Math. 13]}$$

MathFigure 14

$$\Delta x = x(n+1) - x(n) \quad \text{[Math. 14]}$$

MathFigure 15

$$b = hv(n) + \frac{h^2 F(n)}{m} = hv(n) - \frac{kh^2}{m} T^T (Tx(n) - \bar{e}) \quad \text{[Math. 15]}$$

When defining Math Figure 12 as a linear equation using the letters defined by Math Figures 13 to 15, Math Figure 16 is obtained.

MathFigure 16

$$A \Delta x = b \quad \text{[Math.16]}$$

Updating Module

The updating module 30 solves the linear equation established by the analysis module 20 to calculate variation in coordinates of the positions of the respective vertices (S205). In an embodiment of the invention, the updating module 30 can previously calculate a system matrix, which does not differ in value according to a motion of the respective vertices, and store the same in a storage unit 31, in order to make the calculation procedure fast.

The system matrix stored in the storage unit 31 can be explained as follows. Variation in positions of the whole vertices can be indicated as a vector Δx. In vector Δx, while variation in coordinates for each vertex is indicated, it is possible to indicate the variation in coordinates for each coordinate axis for x, y, and z coordinates of the respective vertices by multiplying a proper permutation matrix. The above procedure is carried out by Math Figure 17.

MathFigure 17

$$P\Delta x = P \begin{bmatrix} \Delta u_1 \\ \Delta v_1 \\ \Delta w_1 \\ \vdots \\ \vdots \\ \vdots \\ \Delta u_n \\ \Delta v_n \\ \Delta w_n \end{bmatrix} = \begin{bmatrix} \Delta u_1 \\ \vdots \\ \Delta u_n \\ \Delta v_1 \\ \vdots \\ \Delta v_n \\ \Delta w_1 \\ \vdots \\ \Delta w_n \end{bmatrix} \quad [\text{Math. 17}]$$

In Math Figure 16 that is a linear equation established in analysis module 20, when adapting the permutation matrix P to the matrixes A and b, Math Figure 18 is obtained.

MathFigure 18

$$PAP^T = \begin{bmatrix} A_u & 0 & 0 \\ 0 & A_v & 0 \\ 0 & 0 & A_w \end{bmatrix}_{3n \times 3n, (A_u = A_v = A_w \equiv A_p)}, \quad [\text{Math. 18}]$$

$$Pb = \begin{bmatrix} b_u \\ b_v \\ b_w \end{bmatrix}$$

Au, Av, and Aw each indicate matrices separated from matrix A for x, y, and z coordinates, each matrix having the same value. When substituting Math Figure 18 for the linear equation of Math Figure 16, Math Figure 19 is obtained.

MathFigure 19

$$PAP^T P\Delta x = Pb, (PP^T = I) \Rightarrow \begin{bmatrix} A_p & 0 & 0 \\ 0 & A_p & 0 \\ 0 & 0 & A_p \end{bmatrix} \begin{bmatrix} \Delta u \\ \Delta v \\ \Delta w \end{bmatrix} \quad [\text{Math. 19}]$$

$$= \begin{bmatrix} b_u \\ b_v \\ b_w \end{bmatrix} \Rightarrow \begin{array}{l} A_p \Delta u = b_u, \\ A_p \Delta v = b_v, \\ A_p \Delta w = b_w \end{array}$$

When adapting the permutation matrix, an equation of motion calculated while being separated for each coordinate by a matrix Ap having rows and columns ⅓ times the existing matrix A has been established. A value of Ap can be previously calculated by Math Figure 20 using Cholesky factorization.

MathFigure 20

$$A_p = LL^T \quad [\text{Math. 20}]$$

Cholesky factorization is a well-known method so the detailed description thereof will be omitted. The storage unit 31 previously calculates the system matrix L using the Cholesky factorization, and stores it. A value of the system matrix L is maintained constant irrespective of variation in position of the vertex according to a motion of cloth. Accordingly, the calculated value of the system matrix stored is read out from the storage unit 31 without re-calculating it, and can be used to calculate an equation of motion. Previously calculating and storing the value of the system matrix makes it possible to considerably speed up a velocity of the simulation of cloth.

An integration unit 32 included in the updating module 30 solves the respective linear equations of the right side of Math Figure 18 using the value of the matrix L stored in the storage unit 31 (S205). Values of bu, bv, bw each can be calculated by semi-implicit integration using Math Figure 15. In the above integration process, an equation of motion for the respective coordinates can be implemented in parallel using a plurality of processors under parallel operation environment. The semi-implicit integration is a well-known method so the detailed description thereof will be omitted. The integration unit 32 can calculate the variations Δu, Δy and Δw of the respective coordinates for the whole vertices by the semi-implicit integration, and add the variations to a vector x(n) indicative of the positions of the whole vertices in the previous time step, thereby obtaining an updated position vector x(n+1) (S206).

Through the above procedure, variation over time in positions of the respective vertices on to-be-expressed cloth can be predicted, a force can be calculated using an energy induced using the predicted positions, and an equation of motion to which the calculated force is adapted can be solved so that the positions of the respective vertices can be precisely simulated. According to the cloth simulation system and method of the present invention, a velocity at which the positions of the respective vertices is converged by integration is fast, and the convergence is guaranteed, so that stable simulation of cloth can be implemented. Further, unlike the prior technology, through newly defining the energy between the respective vertices, expression for the physical properties of cloth can be freely regulated, so that the texture and reality of cloth is increased in expressing the cloth.

The real-time cloth simulation system and method according to the present invention can be utilized in a real-time 3D application including games, and can be also effectively used in the existing animation and special effects. The present invention has excellent performance and similar quality relative to the simulator currently used in an animation production and others, and thus substitutes the existing slow simulation software, thereby increasing the reality and reducing the fabricating costs and period. Furthermore, the real-time cloth simulation system and method can be also utilized in a real-time virtual wearing system by which a user can wear clothes under a virtual environment.

Although an exemplary embodiment of the present invention has been described for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention relates to a system and method for simulating the motion of cloth in real-time. More particularly, the present invention relates to a system and method for rapidly and realistically simulating cloth in real-time by estimating variation over time in positions of a plurality of vertices set on the cloth to be expressed, and calculating the motion of the respective vertices through an energy defined using the estimated position, in order to express the texture and motion of the cloth simulated using a computer.

The invention claimed is:

1. A cloth simulation system comprising:
a position calculation module configured to calculate predicted values of relative positions of adjacent vertices among a plurality of vertices on the cloth in a next time step, using the positions of the vertices in previous time steps;
an analysis module configured to establish an equation of motion of the respective vertices using the predicted values of relative positions; and
an updating module which includes a storage device and a plurality of processors configured to calculate a value of a system matrix that does not vary according to the motion of the respective vertices, to store the value of the system matrix in the storage unit, and to update the positions of the respective vertices using the equation of motion and the value of the system matrix,
wherein the analysis module includes:
a force calculation unit configured to calculate forces applied to the respective vertices using an energy between the adjacent vertices, wherein the energy is defined using the predicted values of relative positions, and
an equation establishing unit configured to establish an equation of motion of the respective vertices using the calculated forces, and
wherein the force calculation unit obtains the energy using the following equation, $$E_{i,j} = \frac{1}{2}k\|e_{i,j} - \overline{e}_{i,j}\|^2$$

where $e_{i,j}$ is a relative position between an ith vertex and jth vertex of the vertices in a previous time step, $\overline{e}_{i,j}$ is a predicted value of a relative position between the ith vertex and jth vertex in a next time step, k is a predetermined modulus of elasticity, and $E_{i,j}$ is an energy between the ith vertex and the jth vertex.

2. The cloth simulation system according to claim 1, wherein the position calculation module includes:
a velocity calculation unit configured to obtain velocities of the vertices in the previous time steps; and
a position calculation unit configured to obtain the predicted values of relative positions of the adjacent vertices in the next time step on the basis of the obtained velocities.

3. The cloth simulation system according to claim 1, wherein the updating module further includes
an integration unit configured to solve the equation of motion using the system matrix, and update the positions of the respective vertices according to the solved result.

4. The cloth simulation system according to claim 3, wherein the plurality of processors calculate the system matrix using Cholesky factorization and stores the same.

5. The cloth simulation system according to claim 3, wherein the integration unit solves the equation of motion using semi-implicit integration.

6. A cloth simulation system comprising:
a position calculation module configured to calculate predicted values of relative positions of adjacent vertices among a plurality of vertices on the cloth in a next time step, using the positions of the vertices in previous time steps;
an analysis module configured to establish an equation of motion of the respective vertices using the predicted values of relative positions; and
an updating module which includes a storage device and a plurality of processors configured to calculate a value of a system matrix that does not vary according to the motion of the respective vertices, to store the value of the system matrix in the storage unit, and to update the positions of the respective vertices using the equation of motion and the value of the system matrix,
wherein the position calculation module includes:
a velocity calculation unit configured to obtain velocities of the vertices in the previous time steps, and
a position calculation unit configured to obtain the predicted values of relative positions of the adjacent vertices in the next time step on the basis of the obtained velocities, and
wherein the position calculation unit obtains the predicted values of relative positions using the following equation, $$\overline{e}_{i,j} = L\frac{\overline{x}_j - \overline{x}_i}{\|\overline{x}_j - \overline{x}_i\|}$$

where $\overline{x}_i$ is a predicted position of an ith vertex of the vertices in a next time step, $\overline{x}_j$ is a predicted position of a jth vertex of the vertices in the next time step, L is an initial length between the ith vertex and the jth vertex, and $\overline{e}_{i,j}$ is a predicted value of a relative position between the ith vertex and the jth vertex.

7. A cloth simulation system comprising:
a position calculation module configured to calculate predicted values of relative positions of adjacent vertices among a plurality of vertices on the cloth in a next time step, using the positions of the vertices in previous time steps;
an analysis module configured to establish an equation of motion of the respective vertices using the predicted values of relative positions; and
an updating module which includes a storage device and a plurality of processors configured to calculate a value of a system matrix that does not vary according to the motion of the respective vertices, to store the value of the system matrix in the storage unit, and to update the positions of the respective vertices using the equation of motion and the value of the system matrix,
wherein the position calculation module includes:
a velocity calculation unit configured to obtain velocities of the vertices in the previous time steps, and
a position calculation unit configured to obtain the predicted values of relative positions of the adjacent vertices in the next time step on the basis of the obtained velocities, and
wherein the position calculation unit obtains a predicted position of an ith vertex of the vertices in the next time step using the following equation, $$\overline{x}_i = x_i^n + \frac{1}{2}\alpha\Delta t(v_i^n + v_i^{n-1}), 0 \leq \alpha \leq 1$$

where $x_i^n$ is a position of the ith vertex in a previous time step (n), $v_i^n$ is a velocity of the ith vertex in the previous time step (n), $v_i^{n-1}$ is a velocity of the ith vertex in a previous time step (n−1), Δt is a time interval between the time steps, and $\bar{x}_i$ is a predicted position of the ith vertex of in a next time step.

8. A cloth simulation method comprising:
calculating predicted values of relative positions of adjacent vertices among a plurality of vertices on the cloth in a next time step, using the positions of the vertices in previous time steps;
establishing an equation of motion of the respective vertices using the predicted values of relative positions;
calculating a value of a system matrix which does not vary according to the motion of the respective vertices;
storing the value of the system matrix in a storage unit; and
updating the positions of the respective vertices using the equation of motion and the value of the system matrix stored in the storage unit,
wherein the establishing of the equation of motion includes:
calculating forces applied to the respective vertices using an energy between the adjacent vertices, wherein the energy is defined using the predicted values of relative position; position, and
establishing an equation of motion of the respective vertices using the calculated forces, and
wherein the calculating of the forces applied to the respective vertices includes obtaining the energy using the following equation, $$E_{i,j} = \frac{1}{2} k \|e_{i,j} - \bar{e}_{i,j}\|^2$$

where $e_{i,j}$ is a relative position between an ith vertex and jth vertex of the vertices in a previous time step, $\bar{e}_{i,j}$ is a predicted value of a relative position between the ith vertex and jth vertex in a next time step, k is predetermined modulus of elasticity, and $E_{i,j}$ is an energy between the ith vertex and the jth vertex.

9. The cloth simulation method according to claim 8, wherein the calculating of the predicted values of relative positions includes:
obtaining velocities of the vertices in the previous time steps; and
obtaining the predicted values of relative positions of the adjacent vertices in the next time step on the basis of the obtained velocities.

10. The cloth simulation method according to claim 8, wherein the updating of the positions includes solving the equation of motion using the system matrix, and updating the positions of the respective vertices according to the solved result.

11. The cloth simulation method according to claim 10, wherein the calculating of the value of the system matrix includes calculating the value of the system matrix using Cholesky factorization.

12. The cloth simulation method according to claim 10, wherein the solving of the equation of motion includes solving the equation of motion using semi-implicit integration.

13. A cloth simulation method comprising,
calculating predicted values of relative positions of adjacent vertices among a plurality of vertices on the cloth in a next time step, using the positions of the vertices in previous time steps;
establishing an equation of motion of the respective vertices using the predicted values of relative positions;
calculating a value of a system matrix which does not vary according to the motion of the respective vertices;
storing the value of the system matrix in a storage unit; and
updating the positions of the respective vertices using the equation of motion and the value of the system matrix stored in the storage unit.
wherein the calculating of the predicted values of relative positions includes:
obtaining velocities of the vertices in the previous time steps, and
obtaining the predicted values of relative positions of the adjacent vertices in the next time step on the basis of the obtained velocities, and
wherein the obtaining of the predicted values of relative positions includes obtaining the predicted values of relative positions using the following equation $$\bar{e}_{i,j} = L \frac{\bar{x}_j - \bar{x}_i}{\|\bar{x}_j - \bar{x}_i\|}$$

where $\bar{x}_i$ is a predicted position of the ith vertex of the vertices in a next time step, $\bar{x}_j$ is a predicted position of the jth vertex of the vertices in the next time step, L is an initial length between the ith vertex and the jth vertex, and $\bar{e}_{i,j}$ is a predicted value of a relative position between the ith vertex and the jth vertex.

14. A cloth simulation method, comprising:
calculating predicted values of relative positions of adjacent vertices among a plurality of vertices on the cloth in a next time step, using the positions of the vertices in previous time steps;
establishing an equation of motion of the respective vertices using the predicted values of relative positions;
calculating a value of a system matrix which does not vary according to the motion of the respective vertices;
storing the value of the system matrix in a storage unit; and
updating the positions of the respective vertices using the equation of motion and the value of the system matrix stored in the storage unit,
wherein the calculating of the predicted values o relative positions includes:
obtaining velocities of the vertices in the previous time steps, and
obtaining the predicted values of relative positions of the adjacent vertices in the next time step on the basis of the obtained velocities, and
wherein the obtaining of the predicted values of relative positions includes obtaining a predicted position of an ith vertex of the vertices in a next time step using the following equation, $$\bar{x}_i = x_i^n + \frac{1}{2}\alpha \Delta t (v_i^n + v_i^{n-1}), \ 0 \le \alpha \le 1$$

where $x_i^n$ is a position of the ith vertex in a previous time step (n), $v_i^n$ is a velocity of the ith vertex in the previous time step (n), $v_i^{n-1}$ is a velocity of the ith vertex in a previous time step (n−1), Δt is a time interval between the time steps, and $\bar{x}_i$ is a predicted position of the ith vertex in a next time step.

* * * * *